(12) United States Patent
Alexander et al.

(10) Patent No.: US 7,861,064 B2
(45) Date of Patent: Dec. 28, 2010

(54) METHOD, SYSTEM, AND COMPUTER PROGRAM PRODUCT FOR SELECTIVELY ACCELERATING EARLY INSTRUCTION PROCESSING

(75) Inventors: Khary J. Alexander, Poughkeepsie, NY (US); Fadi Y. Busaba, Poughkeepsie, NY (US); Bruce C. Giamei, Poughkeepsie, NY (US); David S. Hutton, Tallahassee, FL (US); Chung-Lung Kevin Shum, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 368 days.

(21) Appl. No.: 12/037,861

(22) Filed: Feb. 26, 2008

(65) Prior Publication Data

US 2009/0217005 A1  Aug. 27, 2009

(51) Int. Cl.
*G06F 9/34* (2006.01)
*G06F 9/38* (2006.01)

(52) U.S. Cl. ..................... 712/214; 712/219
(58) Field of Classification Search ............... 712/214, 712/217, 218, 219
See application file for complete search history.

(56) References Cited

U.S. PATENT DOCUMENTS

| | | | |
|---|---|---|---|
| 6,678,638 B2 | 1/2004 | Takamura | |
| 6,952,763 B1* | 10/2005 | Swaney et al. | 712/216 |
| 7,185,182 B2* | 2/2007 | Col | 712/219 |
| 2005/0182918 A1* | 8/2005 | Col | 712/218 |
| 2006/0095678 A1* | 5/2006 | Bigelow et al. | 711/137 |

OTHER PUBLICATIONS

International Business Machines Corporation (IBM), z/Architecture Principles of Operations, Sixth Edition (Apr. 2007), 1216 (split into 4 parts).

* cited by examiner

*Primary Examiner*—Daniel Pan
(74) *Attorney, Agent, or Firm*—Cantor Colburn LLP; John Campbell (57) ABSTRACT

A method for selectively accelerating early instruction processing including receiving an instruction data that is normally processed in an execution stage of a processor pipeline, wherein a configuration of the instruction data allows a processing of the instruction data to be accelerated from the execution stage to an address generation stage that occurs earlier in the processor pipeline than the execution stage, determining whether the instruction data can be dispatched to the address generation stage to be processed without being delayed due to an unavailability of a processing resource needed for the processing of the instruction data in the address generation stage, dispatching the instruction data to be processed in the address generation stage if it can be dispatched without being delayed due to the unavailability of the processing resource, and dispatching the instruction data to be processed in the execution stage if it can not be dispatched without being delayed due to the unavailability of the processing resource, wherein the processing of the instruction data is selectively accelerated using an address generation interlock scheme. A corresponding system and computer program product.

12 Claims, 4 Drawing Sheets

METHOD, SYSTEM, AND COMPUTER PROGRAM PRODUCT FOR SELECTIVELY ACCELERATING EARLY INSTRUCTION PROCESSING

BACKGROUND OF THE INVENTION

This invention relates generally to computer processor operation, and more particularly to providing a method, system, and computer program product for selectively accelerating early instruction processing.

Modern computer systems may include one or more processors that implement a processing technique known as pipeline processing (or pipelining) to further improve processing performance, such as speed and efficiency. Pipelining involves processing multiple commands (or instructions) concurrently in various processing stages instead of a more serial manner (e.g., one after the other). Although pipelining is beneficial, it is subject to errors (or hazards), for example, resulting from the concurrent processing of instructions or related data that are interdependent for proper processing results. One example of a pipelining hazard is a read-after-write ("RAW") hazard, in which the result of processing a first instruction is needed to accurately process a second, concurrently processed instruction. In such hazards, if the second instruction is processed (e.g., the related data is read from memory) before the first instruction is sufficiently processed (e.g., before the resulting data is written to memory), the processing of the dependent second instruction may result in an error (e.g., if the processing is not sufficiently delayed), which degrades processor performance.

The decrease in processing speed resulting from RAW hazards can be worsened as the number of stages between the read stage(s) and the write stage(s) in the pipeline staging is increased (e.g., in faster pipelining designs), since the read processing for the dependent second instruction is thereby further delayed by the write processing for the first instruction. There are various approaches to minimize the consequences (or penalty) of RAW hazards, however, an increased amount of component space (or area), processing time (e.g., added delay or latency), and power consumption (collectively, "hardware overhead") is needed for such approaches. Furthermore, some of these approaches implement an early instruction execution scheme that unpredictably causes additional RAW hazards while attempting to prevent such hazards. Thus, an approach to minimize the penalty of RAW hazards without the need for such hardware overhead or the potential to cause other such hazards is desirable.

BRIEF SUMMARY OF THE INVENTION

A method, system, and computer program product for selectively accelerating early instruction processing is provided. An exemplary method embodiment includes receiving an instruction data that is normally processed in an execution stage of a processor pipeline, wherein a configuration of the instruction data allows a processing of the instruction data to be accelerated from the execution stage to an address generation stage that occurs earlier in the processor pipeline than the execution stage, determining whether the instruction data can be dispatched to the address generation stage to be processed without being delayed due to an unavailability of a processing resource needed for the processing of the instruction data in the address generation stage, dispatching the instruction data to be processed in the address generation stage if it can be dispatched without being delayed due to the unavailability of the processing resource, and dispatching the instruction data to be processed in the execution stage if it can not be dispatched without being delayed due to the unavailability of the processing resource, wherein the processing of the instruction data is selectively accelerated using an address generation interlock scheme.

An exemplary system embodiment includes a dispatch logic configured to receive an instruction data that is normally processed in an execution stage of a processor pipeline, wherein a configuration of the instruction data allows a processing of the instruction data to be accelerated from the execution stage to an address generation stage that occurs earlier in the processor pipeline than the execution stage, a control in communication with the dispatch logic and configured to determine whether the instruction data can be dispatched to the address generation stage to be processed without being delayed due to an unavailability of a processing resource needed for the processing of the instruction data in the address generation stage, dispatch the instruction data to be processed in the address generation stage if it can be dispatched without being delayed due to the unavailability of the processing resource, and dispatch the instruction data to be processed in the execution stage if it can not be dispatched without being delayed due to the unavailability of the processing resource, wherein the processing of the instruction data is selectively accelerated using an address generation interlock scheme.

An exemplary computer program product embodiment includes a computer usable medium having a computer readable program, wherein the computer readable program, when executed on a computer, causes the computer to receive an instruction data that is normally processed in an execution stage of a processor pipeline, wherein a configuration of the instruction data allows a processing of the instruction data to be accelerated from the execution stage to an address generation stage that occurs earlier in the processor pipeline than the execution stage, determine whether the instruction data can be dispatched to the address generation stage to be processed without being delayed due to an unavailability of a processing resource needed for the processing of the instruction data in the address generation stage, dispatch the instruction data to be processed in the address generation stage if it can be dispatched without being delayed due to the unavailability of the processing resource, and dispatch the instruction data to be processed in the execution stage if it can not be dispatched without being delayed due to the unavailability of the processing resource, wherein the processing of the instruction data is selectively accelerated using an address generation interlock scheme.

BRIEF DESCRIPTION OF THE DRAWINGS

Referring now to the drawings wherein like elements are numbered alike in the several FIGURES.

DETAILED DESCRIPTION OF EXEMPLARY EMBODIMENTS

Exemplary embodiments of the invention described herein provide a method, system, and computer program product for selectively accelerating early instruction processing. In accordance with such exemplary embodiments, an approach to minimize the penalty of RAW hazards without the need for additional hardware overhead or unpredictably causing additional RAW hazards is provided.

Figure 1:
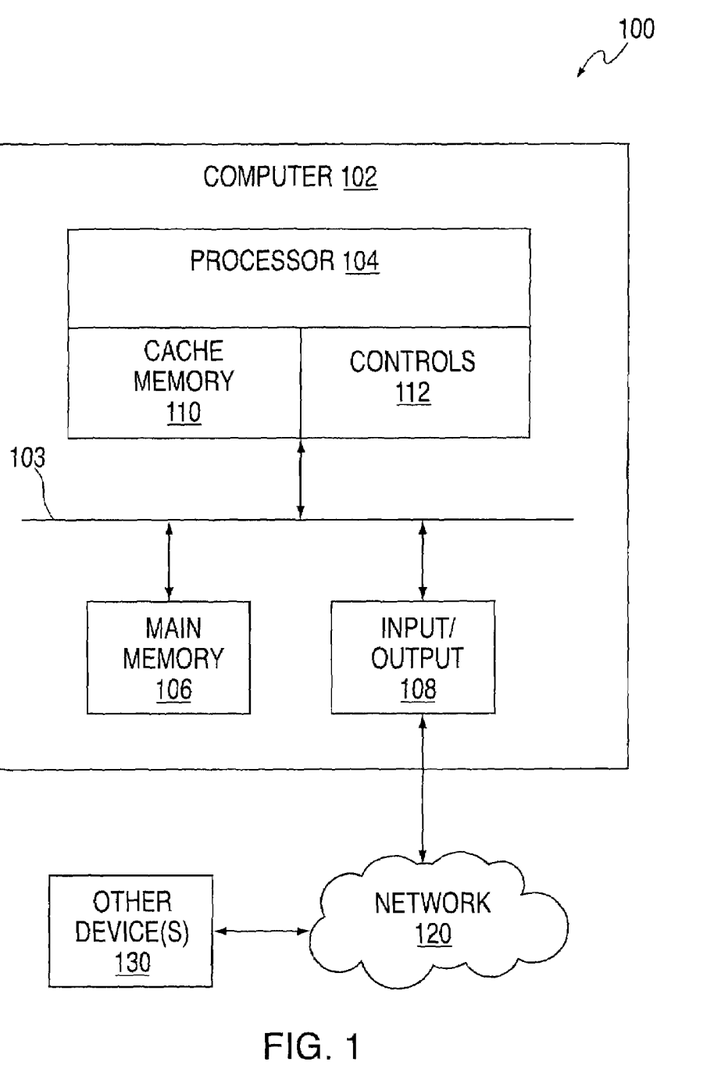
FIG. 1 is a block diagram illustrating an example of a computer system including an exemplary computing device configured for selectively accelerating early instruction processing.

Turning now to the drawings in greater detail, wherein like reference numerals indicate like elements, FIG. 1 illustrates an example of a computer system 100 including an exemplary computing device ("computer") 102 configured for selectively accelerating early instruction processing. In addition to computer 102, exemplary computer system 100 includes network 120 and other device(s) 130. Network 120 connects computer 102 and other device(s) 130 and may include one or more wide area networks (WANs) and/or local area networks (LANs) such as the Internet, intranet(s), and/or wireless communication network(s). Other device(s) 130 may include one or more other devices, e.g., one or more other computers, storage devices, peripheral devices, etc. Computer 102 and other device(s) 130 are in communication via network 120, e.g., to communicate data between them.

Exemplary computer 102 includes processor 104, main memory ("memory") 106, and input/output component(s) 108, which are in communication via bus 103. Processor 104 may include multiple (e.g., two or more) processors, which may implement pipeline processing, and also includes cache memory ("cache") 110, controls 112, and one or more components configured for selectively accelerating early instruction processing that will be described below. Cache 110 may include multiple cache levels (e.g., L1, L2, etc.) that are on or off-chip from processor 104 (e.g., an L1 cache may be on-chip, an L2 cache. may be off-chip, etc.). Memory 106 may include various data stored therein, e.g., instructions, software, routines, etc., which, e.g., may be transferred to/from cache 110 by controls 112 for execution by processor 104. Input/output component(s) 108 may include one or more components, devices, etc. that facilitate local and/or remote input/output operations to/from computer 102, such as a display, keyboard, modem, network adapter, ports, etc. (not depicted).

Figure 2:
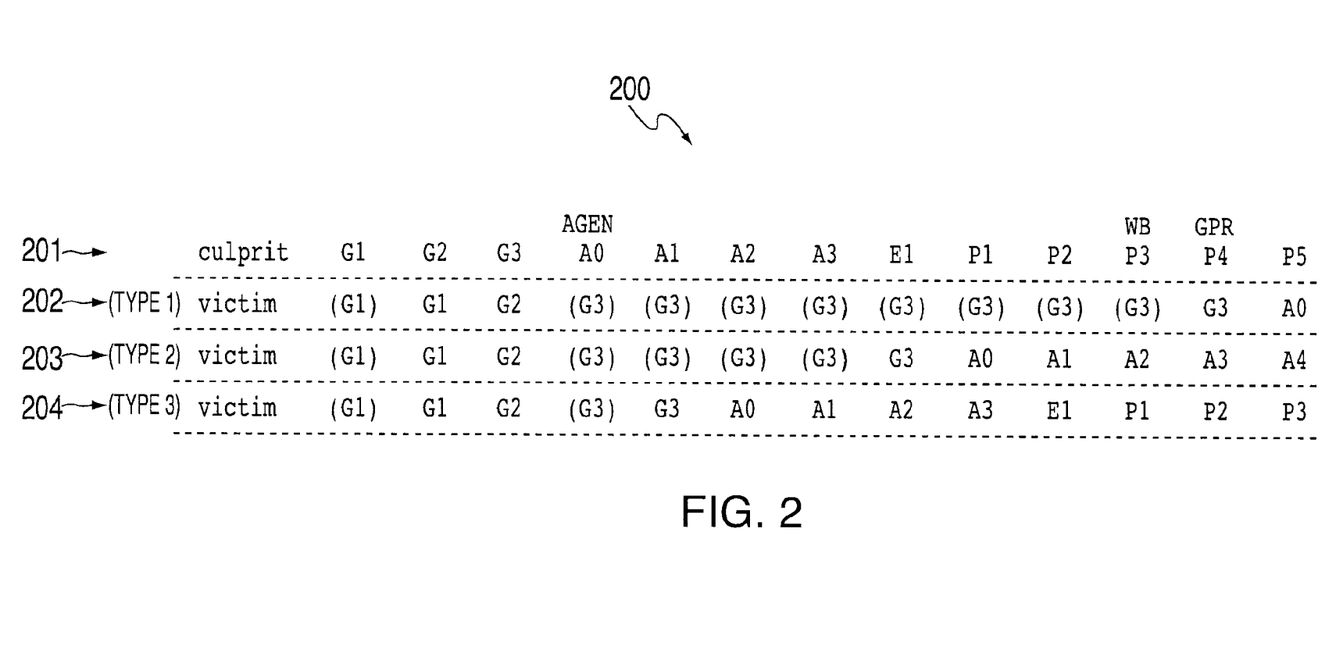
FIG. 2 is a block diagram illustrating an example of an example of a processor pipeline staging of the exemplary computing device of FIG. 1 that is configured for selectively accelerating early instruction processing.

FIG. 2 illustrates an example of a processor pipeline staging 200 for selectively accelerating early instruction processing implementable, e.g., by exemplary computer 102 that is configured. Exemplary staging 200 depicts a read-after-write ("RAW") hazard between an instruction ("culprit") that produces a new register result and a younger instruction ("victim") that needs that result to be processed. Exemplary pipeline staging 200 includes a "culprit" instruction staging 201, a first victim ("type-1 culprit") instruction staging 202, a second victim ("type-2 culprit") instruction staging 203, and a third victim ("type-3 culprit") instruction staging 204. Staging 200 shows an alignment of instruction stagings 201, 202, 203, 204. For example, culprit staging 201 may represent the pipeline stage progression of a culprit "instruction" (e.g., instruction data, such as one or more instruction addresses and/or instruction execution information) through a processor pipeline, while victim stagings 202, 203, 204 may represent the potential processing alignment of victim instructions with respect to the execution and bypassability of the culprit instruction. In that regard, the processing of a victim instruction is dependent on the sufficient prior processing of a culprit instruction to avoid a pipeline hazard (e.g., an "RAW" hazard) and the resulting error and/or processing delay.

For example, in accordance with exemplary staging 200, if the culprit instruction is type-1 (i.e., staging 202), a victim instruction will be delayed or stalled until culprit instruction at least reaches stage P4, which is after the processing (or execution) results (or "result data") of the culprit instruction are written back (e.g., to a general purpose register) in stage P3. This may, e.g., be a normal instruction processing sequence (e.g., without a bypass), but can include a relatively long processing delay, such as the at least 8-cycle stalling of the victim instruction to be dispatched in a G3 stage as depicted in exemplary staging 202. However, if the culprit instruction is type-2 (i.e., staging 203), the culprit instruction can be sufficiently processed to allow the victim instruction to be dispatched (e.g., in stage G3) after at least the execution of the culprit instruction in stage E1. In such case, the victim instruction can be dispatched up to 4 cycles earlier than following the processing of a type-1 culprit instruction. Similarly, if the culprit instruction is type-3 (i.e., staging 204), the culprit instruction can be sufficiently processed to allow the victim instruction to be dispatched (e.g., in stage G3) after at least the address generation ("AGEN") processing of the culprit instruction in stage A1. In this case, the victim instruction can be dispatched up to 3 cycles earlier than following the processing of a type-2 culprit instruction (or up to 7 cycles earlier than following a type-1 culprit).

In the foregoing examples, the culprit instruction processing results are, therefore, available for use in an early processing (e.g., before the normal processing delay according to staging 202) of the victim instruction from the point after the indicated stalling of the victim instruction until the results are written back to the GPR. Depending on their nature (e.g., the processing needs), various instructions may respectively be one of the three types of culprit instructions illustrated by exemplary staging 200 or one of other types that are not depicted. Furthermore, some type-2 culprit instructions can be treated as type-3 culprits to obtain the accelerated early processing benefit over a type-2 culprit. However, such application of a type-2 instruction as a type-3 instruction can sometimes cause the culprit instruction to become a victim to an earlier/older instruction, thereby creating delays earlier in the pipeline than would occur for the younger victim instruction with respect to the culprit. Thus, selective acceleration of such early instruction processing that avoids potential hazards is needed.

Figure 3:
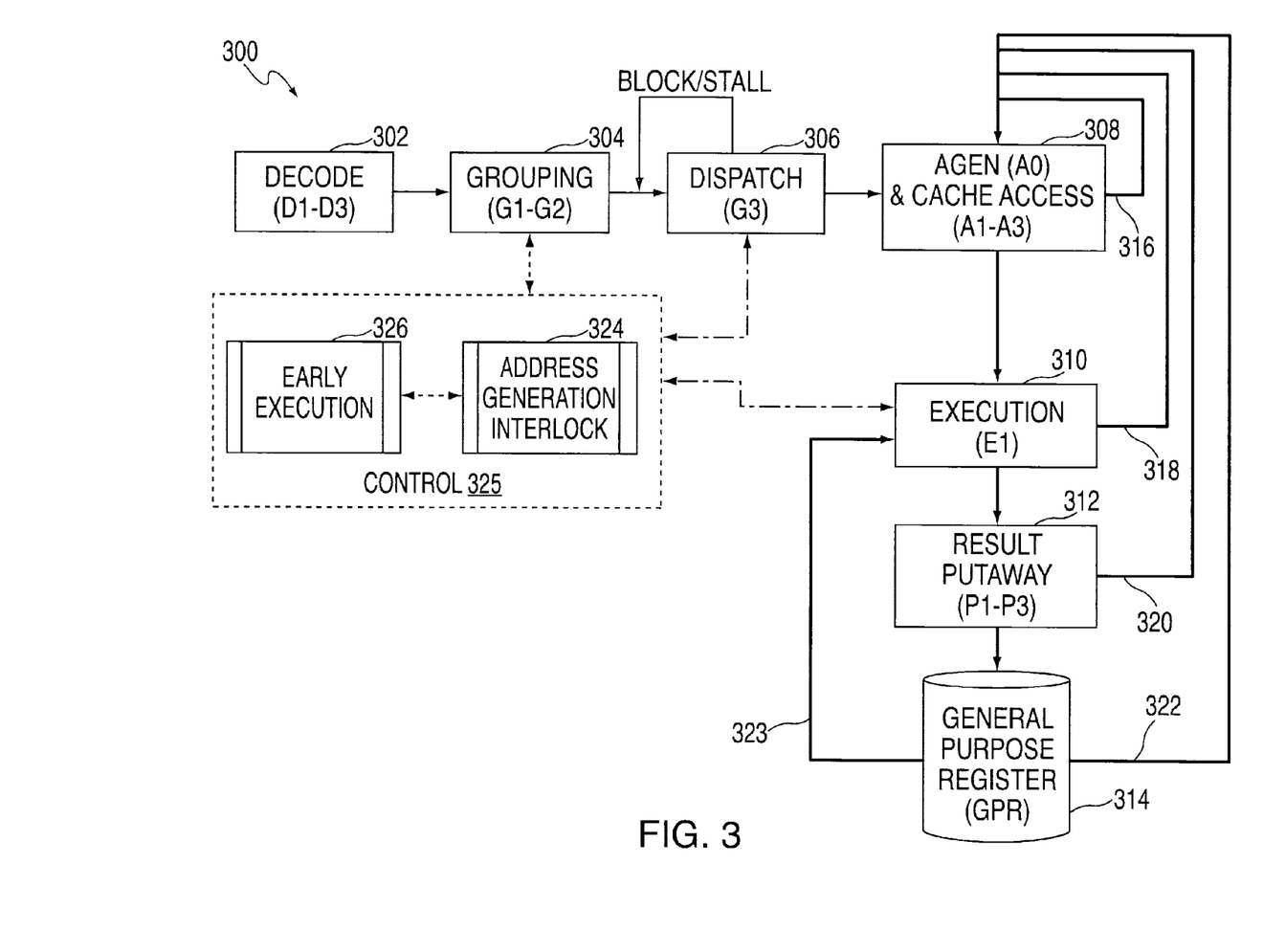
FIG. 3 is a block diagram illustrating a processor pipeline subsystem of the exemplary computing device of FIG. 1 that is configured for selectively accelerating early instruction processing in accordance with the exemplary pipeline staging of FIG. 2.

FIG. 3 illustrates an example of a processor pipeline subsystem 300 of exemplary computer 102 that is configured for selectively accelerating early instruction processing in accordance with exemplary pipeline staging 200. Exemplary pipeline subsystem 300 may, e.g., be implemented by processor 104. Subsystem 300 includes decode logic 302, which is configured to decode instructions (e.g., to provide instruction data, such as one or more instruction addresses and/or instruction text) and determine instruction register dependencies (e.g., to determine respective potential culprit instructions) and execution (or processing) type (e.g., to determine the potential culprit type of the instructions), which decoding occurs, e.g., during pipeline stages D1, D2, D3. Decode logic 302 is in communication with grouping logic 304, which is configured to determine if instructions can be grouped and to group or split instructions accordingly (e.g., during pipeline stages G1, G2). Grouping logic 304 is in communication with dispatch logic 306, which is configured to dispatch or delay (e.g., to stall due to a downstream conflict) instructions (e.g., during pipeline stage G3). Dispatch logic 306 is in communication with address generation ("AGEN") logic 308 and cache access logic 308, which is configured to calculate the location of processing data (e.g., memory operands) and access the cache to either fetch processing data (e.g., source operands) or obtain exclusive ownership of processing data (e.g., destination operands), which occurs, e.g., during pipeline stages A0, A1, A2, A3. Although AGEN logic 308 and cache access 308 are depicted in a single block, the logic can be implemented in separate stages (e.g., AGEN in stage A0 and cache access in stages A1 through A3) as indicated. Cache access logic 308 is in communication with execution logic 310, which is configured to execute instructions (e.g., during pipeline stage E1). Execution logic 310 is in communication with result putaway logic 312, which is configured to commit the results of instructions to an architected state of the processor including through updates (e.g., write-backs-"WB") to the GPR (e.g., during pipeline stage P1, P2, P3). Result putaway logic 312 is in communication with general purpose register ("GPR") 314, which is configured to hold instruction results after write-back (e.g., during stage P3).

GPR 314 is also in communication with execution logic 310 via read path 318, e.g., to provide data to execution logic 310 for normal execution processes. GPR 314 is also communication with AGEN logic 308 via access path 320, which can be used to provide instruction results to AGEN logic 308. Cache access logic 308, execution logic 310, and result putaway logic 312 are in communication with AGEN logic 308 via bypass paths 316, 318, and 320 respectively. In accordance with exemplary staging 200, bypass paths 316, 318 can be used for early instruction result usage in AGEN logic 308. For example, bypass path 318 can be used for early processing according to staging 203 to provide processing results of a type-2 culprit instruction to AGEN and cache access logic 308 for processing of a respective AGEN interlock ("AGI") victim instruction (e.g. during or after stage E1). Similarly, bypass path 316 can be used for early processing according to staging 204 to provide processing results of a type-3 culprit instruction to AGEN and cache access logic 308 for processing of a respective AGI victim instruction (e.g. during or after stage A1). Path 322 is an example of a normal (e.g., non-early or non-bypass) processing of an instruction where processing results are obtained from GPR 314 if needed for processing of another instruction in AGEN and cache access logic 308 or a subsequent stage of the pipeline.

Subsystem 300 also includes control logic ("control") 325, which may include address generation interlock logic ("AGI") 324 and early execution logic 326 (which may be in communication). Control 325 may be in communication, at least, with grouping logic 304, dispatch logic 306, and execution logic 310. Control 325 may be configured (e.g., via AGI 324) to track register updates (e.g., by culprit instructions) throughout pipeline subsystem 300, including availability for bypass based on culprit instruction execution type. Control 325 is also configured (e.g., also via AGI 324) to selectively block the dispatch of instructions via dispatch logic 306 dependent on the availability of GPR 314 updates. Control 325 is also configured (e.g., via early execution logic 326) to selectively modify type-2 instructions to be processed as type-3 instructions to selectively accelerate the early instruction processing of the modified culprit instructions and, therefore, the respective victim instructions. For example, control 325 may modify one or more identifying bits of such type-2 instructions so that they are recognized as type-3 instructions during processing of the instructions and respective victim instructions (e.g., younger or upstream instructions). Control 325 adds little or no hardware overhead to subsystem 300, e.g., since AGI 324 is a normal control for such other functions as described above and early execution logic 326 may add little overhead or none if its functionality is integrated into AGI 324. Thus, control 325 facilitates selective acceleration of early instruction processing with little or no additional hardware overhead and also without the potential for inadvertent creation of hazards that stall the accelerated instructions, since early execution logic within control 325 overrides dispatch block requests by AGI 324 for potentially accelerated instructions accordingly.

In an exemplary operation exemplary processor pipeline subsystem 300, one or more sets of raw instruction text (e.g., "itext" or "instructions") are delivered to the decode stages 302 where the itext is interpreted based on opcodes and expanded into a number of information bits (or "instruction data") that can support instruction grouping, dispatch, execution and completion. The instructions proceed to the grouping stages 304 where, based on the decoded information, super-scalar groups of one or more instructions are formed and delivered for dispatching. Dispatching of instructions is based on the availability of execution (processing) resources. Such resources include execution units and source operands. Control 325 (e.g., via AGI 324) tracks the existence and availability of in-flight (i.e., not yet committed to GPR 314) results for AGEN 208. In the case where an update is unavailable via one of the bypass paths 316, 318, control 325 instructs dispatch logic 306 to hold/stall the instruction until the dependency can be resolved. This stalled instruction becomes the "victim" of AGI (i.e., AGEN interlock) since the progress of the instruction through the processing pipeline 300 is blocked until the AGI is resolved.

The AGI is based on target registers of the inflight instruction (referred to as AGI culprits) and its execution type (e.g. AGEN, execution, etc.). Once all dependencies are resolved by updated values becoming available either via the earliest possible bypass path 316, 318 or are committed back to the GPR 314, the AGI is removed and the victim instruction is allowed to dispatch. Control 325 (e.g., through early execution logic 326) may selectively upgrade the type/bypassability of a culprit from E1 to A1 if by doing so, no additional stalls are induced in the pipeline. This allows for the earlier availability of the instruction result (or "data result"). Upon dispatch an instruction proceeds through the AGEN stage 308 (utilizing the now available updated operands), potentially accesses the data cache (e.g., cache 110) and then executes via execution logic 310 for one or more cycles. At this point, the instruction may have produced results that are needed for the AGI resolution of a younger dependent instruction that it has in turn "victimized". After execution, the results of the instruction progress through result putaway stages 312 before being committed to the GPR 314 at instruction completion.

Figure 4:
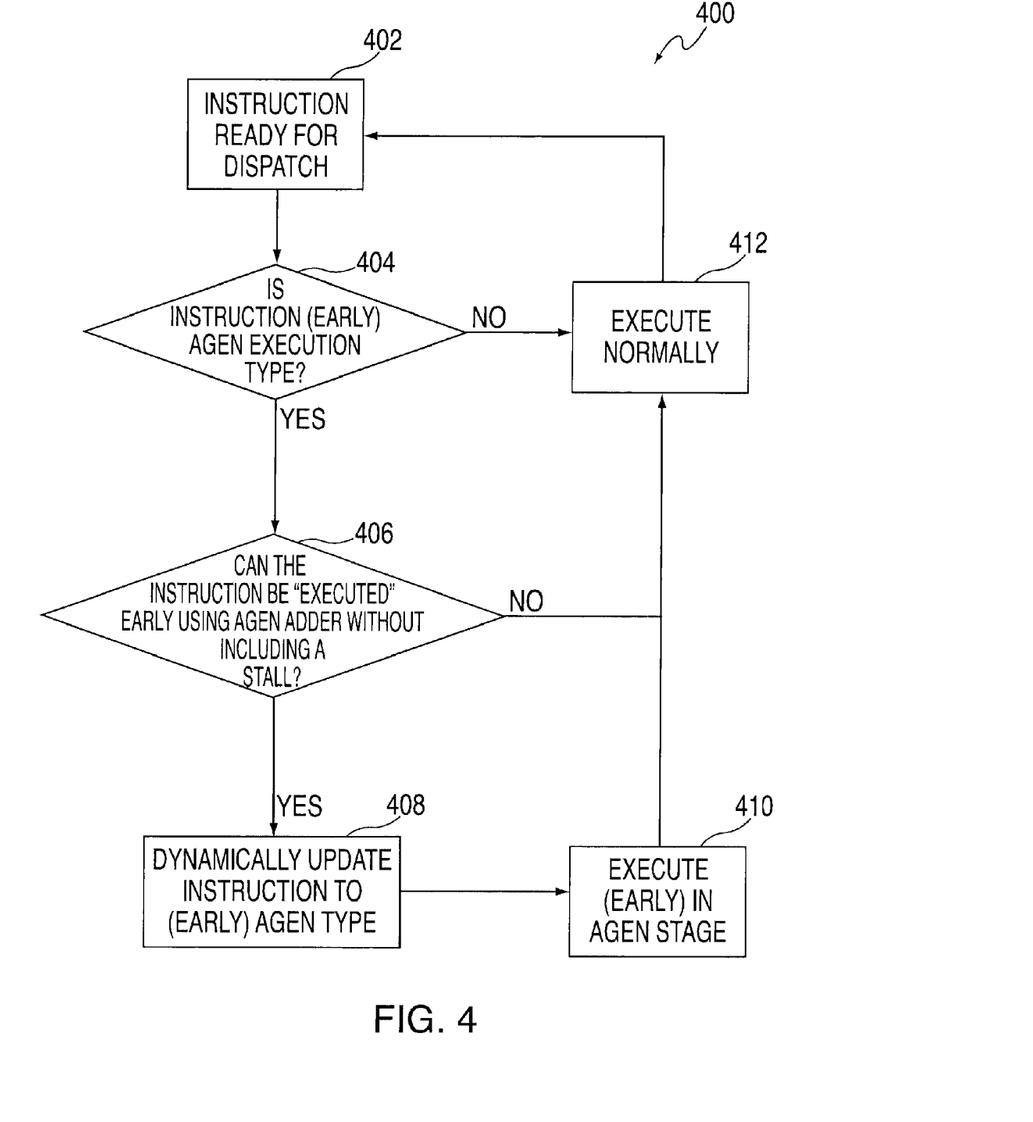
FIG. 4 is a flow diagram illustrating an example of a method for selectively accelerating early instruction processing executable, e.g., on the exemplary computing device of FIG. 1.

FIG. 4 illustrates an example of a method 400 for early instruction execution executable, e.g., on exemplary computer 102, e.g., with respect to a natural E1 execution type instruction. In block 402, an instruction is received that is ready for dispatch after progressing through decode stage 302 and grouping stages 304 and satisfying the natural dependencies. In block 404, it is determined whether the instruction is an early AGEN execution type based on the decoded instruction processing information (or "instruction data"). If it is determined that the instruction is not an early AGEN execution type, method 400 proceeds with block 412 in which the instruction is executed according to the normal pipeline flow. If it is determined that the instruction is an early AGEN execution type, method 400 proceeds with block 406 in which it is determined whether the instruction can be executed early using the AGEN adder (e.g., of AGEN logic 308) without causing a stall in the pipeline. The subset of E1-type instructions that are considered for early AGEN "execution" do not normally utilize the AGEN cycle and, as a result, have no natural AGI dependencies. However, if such an instruction is executed in the AGEN stage, dependencies are created by the control 325. This allows the use of a normal AGI dependency tracking (e.g., via AGC 324 of control 325). If these AGI dependencies can be resolved via normal paths (e.g., bypass 316, 318 or GPR read path 322, etc.), the instruction is allowed to "execute" early in the AGEN stage and marked as A1-type bypassable (e.g., type-3 in staging 200). However, based on the induced dependencies, control 325 (e.g., via AGC 324) recommends that the instruction now be stalled (i.e., treated as an AGI victim), but control 325 (e.g., via execution control 326) overrides the stall request and method 400 proceeds to step 412 in which the instruction is executed according to the normal pipeline flow. If it is determined that the instruction can be executed early using the AGEN adder without causing a stall in the pipeline, method 400 proceeds to step 408 in which control 325 (e.g., via execution control 326) dynamically updates the execution type information of the instruction, which is utilized by control 325 (e.g., via AGC 324), to an AGEN execution type, thereby allowing younger dependent instructions to bypass results from the A1 stage of the instruction. Then, in block 410, the updated instruction is executed early in the AGEN stage (e.g., during stage A0). This execution (or processing) utilizes the existing and otherwise unused stages for the processing of these instructions by the AGEN adder 308. For "early" execution type instructions, the operands are substituted in place of the normal base index and immediate inputs in the AGEN adder.

Elements of exemplary computer system 100, exemplary processor pipeline staging 200, and exemplary processor subsystem 300 are illustrated and described with respect to various components, modules, blocks, etc. for exemplary purposes. It should be understood that other variations, combinations, or integrations of such elements that provide the same features, functions, etc. are included within the scope of embodiments of the invention.

The flow diagram described herein is just an example. There may be many variations to this diagram or the blocks (or operations) thereof without departing from the spirit of embodiments of the invention. For instance, the blocks may be performed in a differing order, or blocks may be added, deleted or modified. All of these variations are considered a part of the claimed invention. Furthermore, although an exemplary execution of the flow diagram blocks is described with respect to elements of exemplary computer system 100, exemplary processor pipeline staging 200, and exemplary processor subsystem 300, execution of the flow diagram blocks may be implemented with respect to other systems, subsystems, etc. that provide the same features, functions, etc. in accordance with exemplary embodiments of the invention.

As described above, embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A method for selectively accelerating early instruction processing, comprising:
receiving an instruction data that is normally processed in an execution stage of a processor pipeline, wherein a configuration of the instruction data allows a processing of the instruction data to be accelerated from the execution stage to an address generation stage that occurs earlier in the processor pipeline than the execution stage;
determining if dispatching the instruction data to the address generation stage for processing results in a delay due to an unavailability of a resource needed for the processing of the instruction data in the address generation stage, the determining responsive to an address generation interlock scheme;
dispatching the instruction data for processing in the address generation stage if it is determined that dispatching the instruction data to the address generation stage for processing does not result in a delay due to the unavailability of the resource; and
dispatching the instruction data for processing in the execution stage if it is determined that dispatching the instruction data to the address generation stage for processing results in a delay due to the unavailability of the resource, the dispatching the instruction data for processing in the execution stage comprising overriding a delaying of the instruction data by the address generation interlock scheme in response to the unavailability of the resource and allowing the instruction data to dispatch to the execution stage via the address generation stage.

2. The method of claim 1, wherein receiving the instruction data comprises:
decoding an instruction into the instruction data;
determining if the instruction data is normally processed in the execution stage of the processor pipeline and if the instruction data is configured to allow a processing of the instruction data to be accelerated from the execution stage to the address generation stage; and
if the instruction data is normally processed in the execution stage and the instruction data is configured to allow a processing of the instruction data to be accelerated, configuring the instruction data with an address generation information for a processing in the address generation stage, with an execution information for a processing in the execution stage, and with an identifying portion that indicates the instruction data is normally processed in the execution stage.

3. The method of claim 1, wherein the determining if dispatching the instruction data to the address generation stage for processing results in a delay due to an unavailability of a resource comprises:
   treating the instruction data as dependent on a result data from a processing of an older instruction data, wherein the resource includes the result data;
   determining whether the result data will be available for the processing of the instruction data in the address generation stage; and
   concluding that the instruction data can not be dispatched without being delayed if the result data will not be available for the processing of the instruction data in the address generation stage.

4. The method of claim 1, wherein the processing of the instruction data produces a data result that is needed for the processing of a younger instruction, and dispatching the instruction data to be processed in the address generation stage comprises configuring the instruction data with an identifying portion that indicates to the address generation interlock scheme that the processing of the instruction data produces the data result in the address generation stage for a use by the younger instruction and that indicates to the address generation stage that the data result is valid.

5. A system for selectively accelerating early instruction processing, comprising:
   a dispatch logic unit configured for receiving an instruction data that is normally processed in an execution stage of a processor pipeline, wherein a configuration of the instruction data allows a processing of the instruction data to be accelerated from the execution stage to an address generation stage that occurs earlier in the processor pipeline than the execution stage;
   a control unit in communication with the dispatch logic unit and configured for:
      determining if dispatching the instruction data to the address generation stage for processing results in a delay due to an unavailability of a resource needed for the processing of the instruction data in the address generation stage, the determining responsive to an address generation interlock scheme;
      dispatching the instruction data for processing in the address generation stage if it is determined that dispatching the instruction data to the address generation stage for processing does not result in a delay due to the unavailability of the resource; and
      dispatching the instruction data for processing in the execution stage if it is determined that dispatching the instruction data to the address generation stage for processing results in a delay due to the unavailability of the resource, the dispatching the instruction data for processing in the execution stage comprising overriding a delaying of the instruction data by the address generation interlock scheme in response to the unavailability of the resource and allowing the instruction data to dispatch to the execution stage via the address generation stage.

6. The system of claim 5, further comprising a decoder logic unit in communication with the dispatch logic unit and configured for:
   decoding an instruction into the instruction data;
   determining if the instruction data is normally processed in the execution stage of the processor pipeline and if the instruction data is configured to allow a processing of the instruction data to be accelerated from the execution stage to the address generation stage; and
   if the instruction data is normally processed in the execution stage and the instruction data is configured to allow a processing of the instruction data to be accelerated, configure the instruction data with an address generation information for a processing in the address generation stage, with an execution information for a processing in the execution stage, and with an identifying portion that indicates the instruction data is normally processed in the execution stage.

7. The system of claim 5, wherein the determining if dispatching the instruction data to the address generation stage for processing results in a delay due to an unavailability of a resource comprises:
   treating the instruction data as dependent on a result data from a processing of an older instruction data, wherein the resource includes the result data;
   determining whether the result data will be available for the processing of the instruction data in the address generation stage; and
   concluding that the instruction data can not be dispatched without being delayed if the result data will not be available for the processing of the instruction data in the address generation stage.

8. The system of claim 5, wherein the processing of the instruction data produces a data result that is needed for the processing of a younger instruction, and the dispatch logic unit is configured to dispatch the instruction data to be processed in the address generation stage by configuring the instruction data with an identifying portion that indicates to the address generation interlock scheme that the processing of the instruction data produces the data result in the address generation stage for a use by the younger instruction and that indicates to the address generation stage that the data result is valid.

9. A computer program product for selectively accelerating early instruction processing, the computer program product comprising: a tangible storage medium readable by a processing circuit and storing instructions for execution by the processing circuit for performing a method comprising:
   receiving an instruction data that is normally processed in an execution stage of a processor pipeline, wherein a configuration of the instruction data allows a processing of the instruction data to be accelerated from the execution stage to an address generation stage that occurs earlier in the processor pipeline than the execution stage;
   determining if dispatching the instruction data to the address generation stage for processing results in a delay due to an unavailability of a resource needed for the processing of the instruction data in the address generation stage, the determining responsive to an address generation interlock scheme;
   dispatching the instruction data for processing in the address generation stage if it is determined that dispatching the instruction data to the address generation stage for processing does not result in a delay due to the unavailability of the resource; and
   dispatching the instruction data for processing in the execution stage if it is determined that dispatching the instruction data to the address generation stage for processing results in a delay due to the unavailability of the resource, the dispatching the instruction data for processing in the execution stage comprising overriding, a delaying of the instruction data by the address generation interlock scheme in response to the unavailability of the resource and allowing the instruction data to dispatch to the execution stage via the address generation stage.

10. The computer program product of claim 9, wherein receiving the instruction data comprises:
- decoding an instruction into the instruction data;
- determining if the instruction data is normally processed in the execution stage of the processor pipeline and if the instruction data is configured to allow a processing of the instruction data to be accelerated from the execution stage to the address generation stage; and
- if the instruction data is normally processed in the execution stage and the instruction data is configured to allow a processing of the instruction data to be accelerated, configuring the instruction data with an address generation information for a processing in the address generation stage, with an execution information for a processing in the execution stage, and with an identifying portion that indicates the instruction data is normally processed in the execution stage.

11. The computer program product of claim 9, wherein the determining if dispatching the instruction data to the address generation stage for processing results in a delay due to an unavailability of a resource comprises:
- treating the instruction data as dependent on a result data from a processing of an older instruction data, wherein the resource includes the result data;
- determining whether the result data will be available for the processing of the instruction data in the address generation stage; and
- concluding that the instruction data can not be dispatched without being delayed if the result data will not be available for the processing of the instruction data in the address generation stage.

12. The computer program product of claim 9, wherein the processing of the instruction data produces a data result that is needed for the processing of a younger instruction, and the computer dispatches the instruction data to be processed in the address generation stage by configuring the instruction data with an identifying portion that indicates to the address generation interlock scheme that the processing of the instruction data produces the data result in the address generation stage for a use by the younger instruction and that indicates to the address generation stage that the data result is valid.

* * * * *